July 26, 1960 M. W. G. BAHR 2,946,250
APPARATUS FOR CUTTING REINFORCED TUBING
Filed July 30, 1956 4 Sheets-Sheet 1

INVENTOR.
MORRIS W. G. BAHR
BY
Robert A. Green
ATTORNEY

INVENTOR.
MORRIS W. G. BAHR
BY
Robert A. Green
ATTORNEY

United States Patent Office 2,946,250
Patented July 26, 1960

2,946,250
APPARATUS FOR CUTTING REINFORCED TUBING

Morris W. G. Bahr, 732 Riverside Ave., Trenton, N.J.

Filed July 30, 1956, Ser. No. 600,954

8 Claims. (Cl. 83—176)

This invention relates to the art of cutting flexible tubing and particularly to cutting reinforced tubing of the type comprising a flexible shell of cloth or the like having a wire coil or helix embedded therein.

Since reinforced tubing of the type contemplated herein comprises relatively soft and relatively hard materials, the cutting of such tubing presents special problems which have not been satisfactorily solved by prior art machines. The objects of the present invention are concerned with the provision of improved method and apparatus for cutting metal-reinforced flexible tubing.

In general, the method of the invention comprises first cutting the wire helix which reinforces the tubing and then, while holding the cut ends of the coil of the helix spread apart so that a clear path is provided through the soft flexible shell of the tubing, a cutting blade is passed through the shell between said cut ends to complete the cutting operation. The apparatus of the invention includes a first pair of cutting blades which are slidably positioned adjacent to each other. Initially, the blades are spaced apart and the tubing is pressed onto them so that the blades pierce the soft casing with one blade on either side of one turn of the reinforcing metal helix. The blades are then moved toward each other so that they converge on each other and on the turn of the helix which is positioned between them. As the blades move, they cut a narrow slit in the soft tubing. As the movement of the blades with respect to each other is continued and they slide past each other, they cut the turn of the helix and spread the cut ends thereof apart. A second cutting blade is then passed through the soft casing and between the cut ends of the turn of the helix and the cutting operation is completed. The second cutting blade cuts through only relatively soft material so that it is not dulled to any extent as it cuts.

In the drawing sheets:

Figure 4:
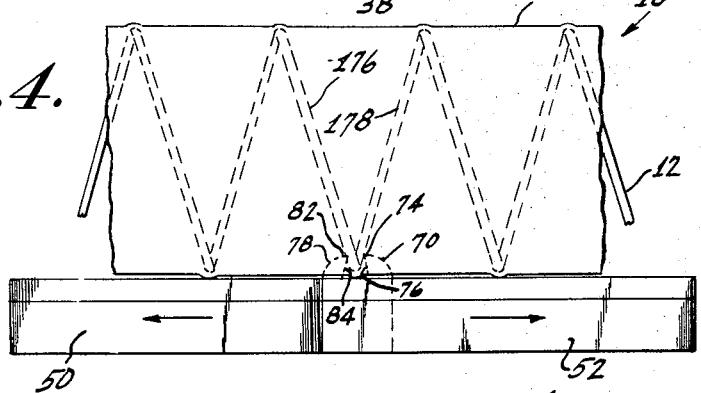
Fig. 4 is an elevational view of the apparatus shown in Fig. 3 with a piece of reinforced tubing mounted thereon.
Figure 5:
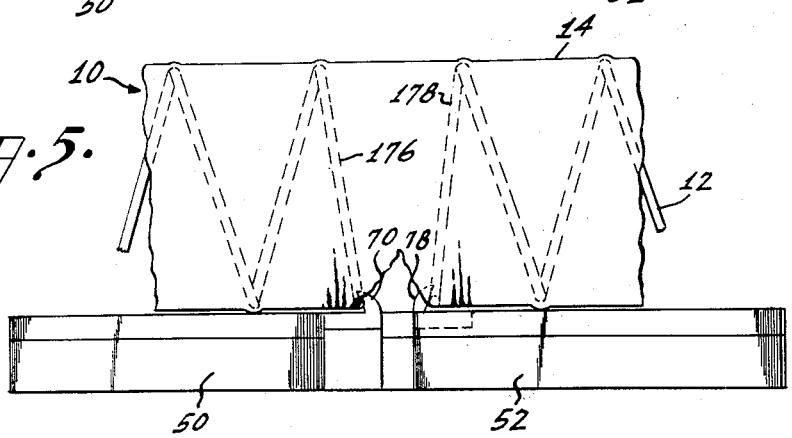
Fig. 5 is an elevational view of the apparatus and tubing of Fig. 4 in another stage in the cutting process.
Figure 6:
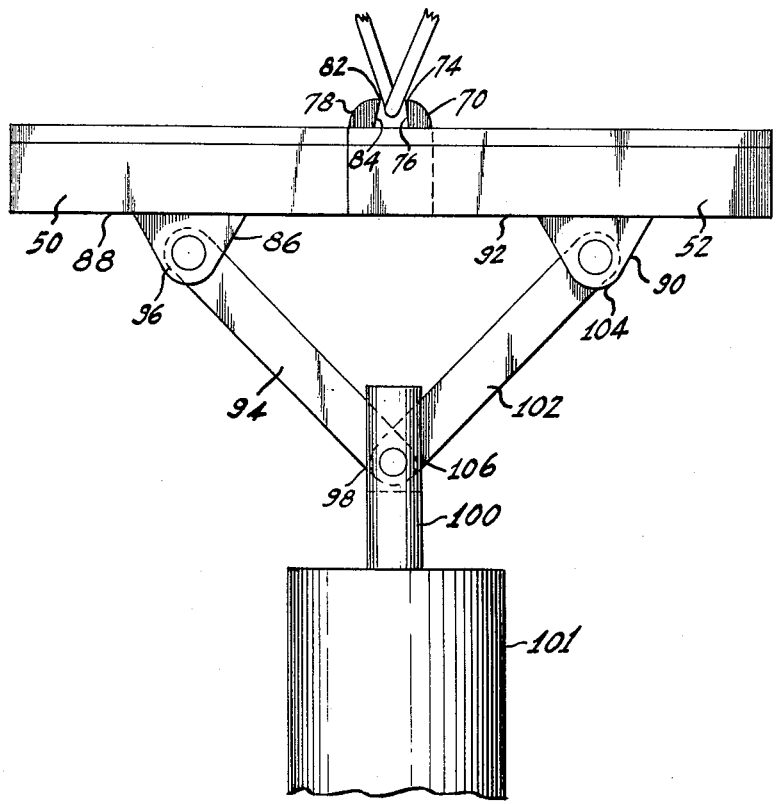
Fig. 6 is an elevational view of a portion of the apparatus shown in Fig. 3 and driving means therefor.

The method and apparatus described herein is suitable for cutting reinforced flexible tubing 10 of the type employed in automobile defroster systems and shown in Figs. 4 and 5. Such tubing generally comprises a wire helix of copper-clad iron or the like designated 12 embedded in a thin-walled flexible shell 14 of a material such as ordinary friction tape or the like. This type of tubing is well known and will not be described in detail.

Figure 1:
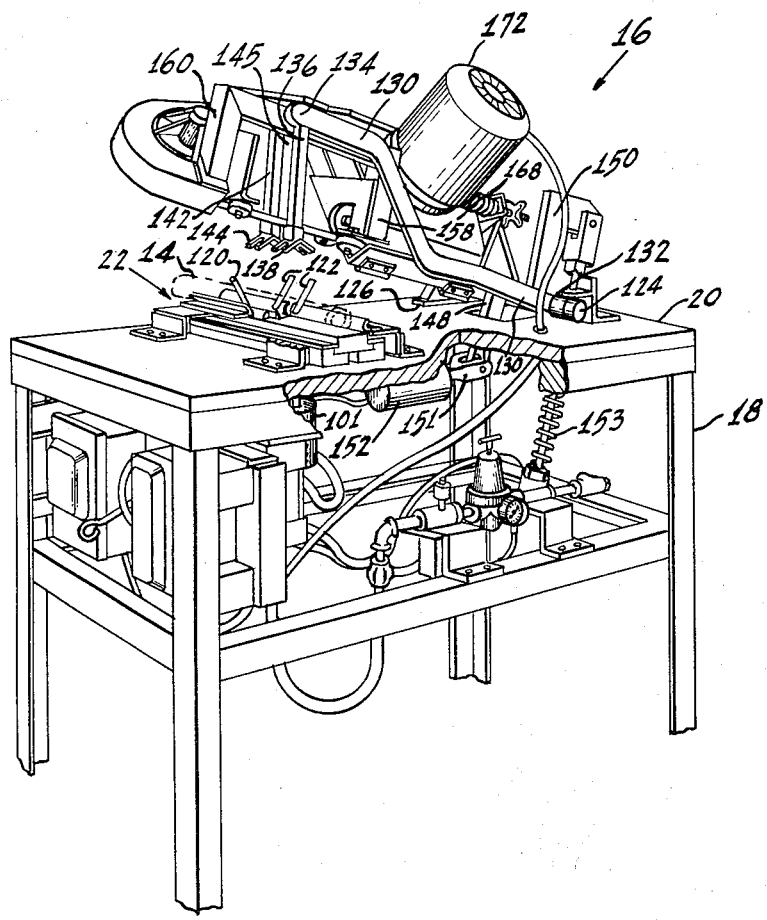
Fig. 1 is a perspective view partly in section of the front of the apparatus of the invention.

Referring to Fig. 1, a machine 16 for cutting the reinforced flexible tubing 10 comprises a table 18 having a table top 20 on which various operating portions of the machine are mounted. These operating portions of the machine include a first cutting means for cutting the wire helix. The first cutting means is designated 22 and is located generally at the left of the center of the table top as seen in Fig. 1. The first cutting means 22 includes a pair of support blocks 24 and 26 of steel or the like suitably secured to the table top 20. The blocks 24 and 26 extend substantially across the entire width of the table top and have adjacent edges 28 and 30, respectively, spaced apart and parallel to each other so that a channel 32 is provided between them. The support blocks 24 and 26 are generally L-shaped in cross section. The block 24 has a vertical leg 34 and a horizontal leg 36 extending therefrom toward the channel 32 and the block 26 has a vertical leg 38 and a horizontal leg 40 extending therefrom toward the channel 32 between the support blocks. Thus, the horizontal legs 36 and 40 of the support blocks face each other.

A thin flat plate 42, of steel or the like, is suitably secured to the top surface 44 of the vertical leg 34 of the support block 24. The plate 42 is preferably wider than the vertical leg 34 and an overhanging portion 45 thereof extends over and is spaced from the horizontal leg 36. A second similar thin flat plate 46 of steel or the like is suitably secured to the top surface 48 of the vertical leg 38 of the support block 26. The plate 46 is wider than the vertical leg 38 and has an overhanging portion 49 which extends over and is spaced from the horizontal leg 40 of the support block 26. Thus, a slide channel is provided between the flat plates 42 and 46 and the support blocks 24 and 26, respectively.

A pair of sliding blocks 50 and 52, of steel or the like are axially aligned end to end and are slidably mounted in the slide channel provided between the flat plates 42 and 46 and the support blocks 24 and 26, respectively. The sliding blocks are adapted to mesh or interlock at their front ends and, in one convenient construction, the sliding block 50 has a front edge which includes a recessed portion 54 and a projecting portion 56. The recessed portion 54 extends from one edge 58 of the sliding block 50 to about the center line or longitudinal axis of the block 50 and the projecting portion 56 extends in width from about the center line to the other edge 60 of the block 50. Similarly, the front end of the sliding block 52 includes a recessed portion 62 and a projecting portion 64 with the recessed portion 62 extending in width from one edge 66 to the center line or longitudinal axis of the block 52 and the projecting portion 64 extending in width from about the center line to the other edge 68 of the block 52. The edges 58 and 68 and the edges 60 and 66 are substantially aligned and continuous with each other. The projecting portion 56 of the block 50 is adapted to fit into the recessed portion 62 of the block 52 and the projecting portion 64 of the block 52 is adapted to fit into the recessed portion 54 of the block 50.

The sliding blocks 50 and 52 carry and manipulate the cutting means for cutting the wire helix 12 in the tubing 10. The cutting means includes a first cutting jaw 70 mounted in any suitable fashion on a support plate 72 which is secured by bolts or the like in a suitable recess in the top surface 73 of the projecting portion 56 of the block 50 at about the center line of the block. The cutting jaw 70 includes a sharply pointed tip 74 and a cutting edge 76 which is oriented substantially at the edge of the projecting portion which is adjacent to the center line and faces rearwardly toward the rear end of the block 50 remote from the block 52. A second cutting jaw 78 is mounted on a support block 80 which is secured in a suitable recess in the top surface 81 of the projecting portion 64 of the block 52 at about the center line thereof. The second cutting jaw includes a sharply pointed tip 82 and a cutting edge 84 oriented close to the center line of the block 52 and facing rearwardly toward the end of the block 52 which is remote from the block 50. The cutting jaws are so positioned on their respective sliding blocks that only a very small transverse distance separates them, that is, when the sliding blocks are so positioned that the cutting jaws are side by side, then the jaws are close together with a distance of about a few centimeters between them. With such a relationship between the cutting jaws, efficient cutting of the wire helix is achieved as described in greater detail below.

Figure 3:
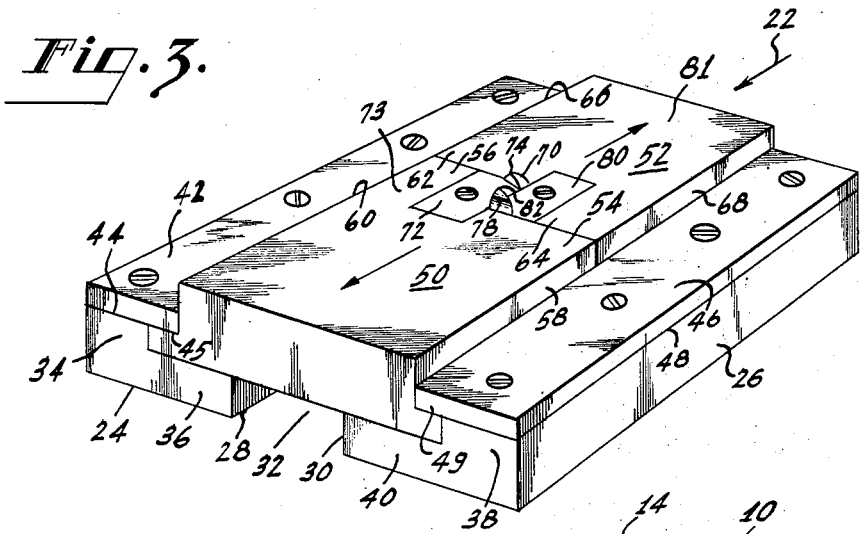
Fig. 3 is a perspective view of one of the cutting means of the apparatus shown in Fig. 1.

In the position shown in Fig. 3, the sliding blocks 50 and 52 are interlocked and the cutting jaws 70 and 78 are spaced apart longitudinally with the sharp cutting edges 76 and 84 facing each other. When the sliding blocks are moved apart and away from each other, the cutting jaws first move toward each other and slide closely past each other and then move away from each other. This relative movement of the sliding blocks may be effected by any suitable arrangement. In one suitable mechanical arrangement, an apertured bracket 86 is suitably secured to bottom surface 88 of the sliding block 50 and a similar apertured bracket 90 is suitably secured to bottom surface 92 of the sliding block 52. The brackets are secured to the sliding blocks so that they are positioned within the channel 32 between the support blocks 24 and 26. An arm 94 is pivotally connected at one end 96 to the bracket 86 and at the other end 98 it is pivotally connected to a piston rod 100 of a conventional double-acting air cylinder 101. Similarly, an arm 102 is pivotally connected at one end 104 to the bracket 90 and at the other end 106, it is pivotally connected to the piston rod 100 of the air cylinder. When the air cylinder 101 is operated to drive the piston rod upward, the force transmitted through the arms 94 and 102 drives the sliding blocks 50 and 52 apart. When the air cylinder is operated to drive the piston rod downward, the sliding blocks are drawn together into their meshed or interlocked position. The sliding blocks might also be driven by a suitable combination of gears or the like.

Figure 2:
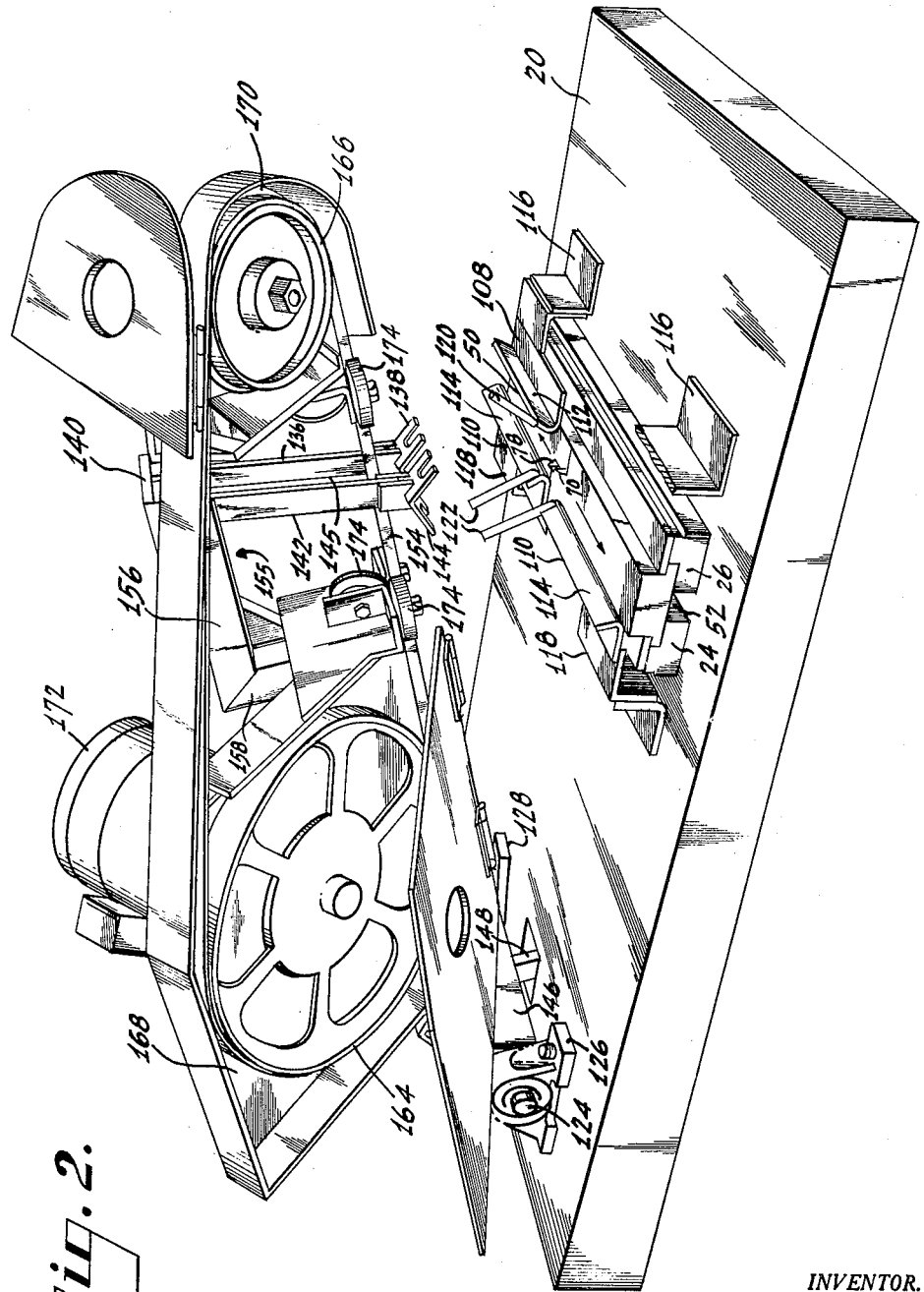
Fig. 2 is a rear perspective view of the apparatus of Fig. 1.

A guide holder for the tubing to be cut is mounted in operative relation with the cutting apparatus described above, as shown in Figs. 1 and 2. The guide holder includes two pairs of V-shaped angle irons 108 (one being shown) and 110, the pairs being parallel to each other and spaced apart on opposite sides of the sliding blocks 50 and 52 to provide a guide channel between them. The vertex of each piece of angle iron is oriented toward the cutting jaws 70 and 78 and legs 112 of the irons 108 and legs 114 of irons 110 are disposed at an angle to each other and flare outwardly so that a favorable seat is provided for circular tubing of the type to be cut. The pairs of angle irons are secured to the table top 20 in any suitable fashion, for example by means of pairs of brackets 116 and 118.

Auxiliary tubing guide means are provided in the form of rods 120 secured to legs 112 of angle irons 108 and rods 122 secured to legs 114 of the irons 110. The rods 120 are disposed at substantially the same angle to the rods 122 as the legs 112 are disposed to the legs 114. Corresponding rods 120 and 122 are alined with each other substantially transversely of the longitudinal axes of the sliding blocks 50 and 52. In addition, the rods 120 and 122 are spaced apart on the legs 112 and 114, respectively, by the same distance, this distance being such that when tubing to be cut is disposed in cutting position in the guide channel on the sliding blocks, the rods are positioned on opposite sides of a turn of the wire helix and each of the cutting jaws 70 and 78 is similarly positioned. These spacings will vary for different types and sizes of tubing.

Thus far, means for cutting the wire helix has been described. The machine 16 also includes means for cutting the flexible shell 14 of the tubing 10 which is also mounted on the table top 20 and which includes a shaft 124 rotatably mounted in suitable bearing blocks 126 and 128 at the right hand end of the table top as seen in Fig. 1. Thus, the shaft 124 is positioned remote from the cutting means 22 and extends across substantially the entire width of the table parallel to the sliding blocks 50 and 52. A generally Z-shaped arm 130 is rotatably mounted at one end 132 on the shaft 124 and its other end 134 terminates substantially directly over the cutting means 22. A first arms 136 is secured to the end 134 of the Z-shaped arm 130 and extends substantially vertically downwardly therefrom toward the wire cutting means 22 where it terminates in an inverted V-shaped member 138 which, during the cutting operation, rests on the tubing being cut. A small metal cross plate or connecting plate 140 is secured to the end 134 of the Z-shaped arm and extends transversely thereof and a second arm 142 similar to the arm 136 extends vertically downwardly therefrom and also terminates in an inverted V-shaped member 144 which is also adapted to bear against the tubing while it is being cut. The arms 136 and 142 are spaced apart and aligned to provide a channel 145 between them.

A yoke 146 is suitably fixed to the shaft 124 so that it rotates with the shaft. The yoke includes an arm 148 which extends vertically downwardly beneath the table top 20 on the left side of the shaft as seen in Fig. 1, and a second arm 150, a counterbalancing arm, extends vertically upwardly above the table top and to the right of the shaft 124. The downwardly extending arm 148 is pivotally secured to a piston rod 151 of a conventional double-acting air cylinder 152 suitably secured beneath the table top. The air cylinder drives the shaft 124 in clockwise and counter-clockwise directions. The counterbalancing arm 150 of the yoke 146 is secured to a biasing tension spring 153 which is suitably secured to the table 18 so that the shaft is thereby urged in a clockwise direction. The yoke 146 is coupled to a support arrangement which carries the apparatus for cutting the resilient shell of the tubing which, in this case, is a band saw.

The support arrangement for band saw 154 includes an inverted U-shaped frame 155 having a horizontal leg 156 and spaced vertical legs 158 and 160 which provide a free space between them by which access may be had to the band saw. The U-shaped frame 155 fits between the straight arms 136 and 142 and the horizontal leg 156 thereof bears against the cross plate 140. The band saw 154 is carried by and driven by a pair of wheels 164 and 166 mounted on suitable support plates 168 and 170, respectively, which are positioned on either side of the U-shaped frame and are integral therewith to provide a unitary support assembly. Thus, this unitary assembly includes the yoke 146, the plate 168, the U-shaped frame 155, and the plate 170. The wheel 164 is suitably connected to and is driven by a motor 172 supported on the support plate 168. The support plates 168 and 170 are disposed at about a 45° angle to the horizontal so that only the portion of the band saw 154 which extends between the vertical legs 158 and 160 of the U-shaped frame 155 can cut into the tubing during the cutting operation.

In order to hold the saw 154 at the proper cutting angle between the two vertical legs 158 and 160 of the U-shaped frame 155, the saw runs between two sets of guide rollers 174 positioned adjacent to the vertical legs inside the U-shaped frame.

In operation of the tube cutting machine 16, a piece of the tubing 10 is placed on the cutting means 22 between the support rods 120 and 122 and resting on the sliding blocks 50 and 52. The air cylinder 152 is then energized in any suitable fashion, for example by a foot switch (not shown). The piston rod 151 is moved to the right (Fig. 1) and the force thereby imparted to the arm 148 of the yoke 146 causes the shaft 124 to rotate in a counter-clockwise direction as seen in Fig. 1. This rotation of the shaft causes the band saw support assembly to rotate counterclockwise and, at the same time, the weight of the Z-shaped arm 130 causes it to move downwardly and the V-members 138 and 144 come into contact with and bear against the tubing and the pressure applied to the tubing causes the jaw blades 70 and 78 to pierce the shell of the tubing (Fig. 4). Continued rotation of the shaft 124 and the saw support assembly brings the band saw 154 into contact with the tubing between adjacent turns 176 and 178 (Fig. 5) of the wire helix and the saw begins to cut through the resilient shell. At the same time, the air cylinder 101 is energized so that the jaw blades 70 and 78 and sliding blocks 50 and 52 are driven apart. Thus a turn of the wire helix is cut as shown in Fig. 5. The sliding blocks are thus held extended remote from each other so that the cut ends of the helix are held apart. Thus, as the band saw cuts through the resilient shell of the tubing, it does not touch the wire helix and is not dulled.

An electro-mechanical control system for operating the machine of the invention is not described herein since it is well within the ordinary skill of those working in the art to provide a suitable system.

What is claimed is:

1. Apparatus for cutting reinforced tubing comprising a resilient shell and a metallic wire embedded therein, said apparatus comprising support means for supporting the tubing to be cut, wire-cutting means on said support means for piercing the resilient shell of said tubing and cutting the metallic wire therein and holding the cut ends of said wire apart, and means movable into and out of contact with said tubing for cutting said resilient shell, said last-named means comprising a saw positioned to cut said shell between the cut ends of the metallic wire.

2. Apparatus for cutting reinforced tubing consisting of a resilient shell and a metal helix embedded therein, said apparatus comprising support means for said tubing to be cut, a first cutting means on said support means, said first cutting means comprising a pair of cutting jaws having first portions adapted to pierce said resilient shell and second portions adapted to cut a turn of said metal helix, said cutting means also being adapted to hold apart the cut ends of said turn of said helix, and a second cutting means movable into and out of contact with said tubing for cutting said resilient shell, said second cutting means being positioned to cut said shell between the cut ends of said turn of said helix.

3. Apparatus for cutting into lengths reinforced tubing consisting of a resilient shell having a metal helix embedded therein, said apparatus comprising support means for the tubing to be cut, a pair of cutting jaws on said support means and movable with respect to each other and having portions for piercing said resilient shell and cutting a turn of said helix, means coupled to said cutting jaws for holding them apart whereby the cut ends of said turn of the helix are held spaced apart, and cutting means on said support for cutting through said tubing transversely of the axis thereof and positioned so that it cuts said shell between the cut ends of said turn of said helix.

4. Apparatus for cutting into lengths reinforced tubing consisting of a resilient shell having a metal helix embedded therein, said apparatus comprising a pair of cutting jaws movable with respect to each other and having portions for piercing said shell, driving means coupled to said jaws for separating them and cutting a turn of said helix and at the same time holding the cut ends of said turn apart, and a saw blade movable into and out of operative relation with said cutting jaws for cutting through said shell, said saw blade being positioned to cut through said shell between the cut ends of said turn.

5. Apparatus for cutting into lengths reinforced tubing consisting of a resilient shell having a metal helix embedded therein, said apparatus comprising a pair of support members axially aligned and slidable with respect to each other, a cutting jaw mounted on each of said support members and having a first portion for piercing said resilient shell and a second portion for cutting a turn of said helix, said support means being adapted to hold said cutting jaws apart and thereby hold the cut ends of said turn spaced apart, and cutting means movable into and out of operative relation with said tubing for cutting said tubing transversely of its axis and between the cut ends of said turn of said helix, said cutting means being positioned to cut said shell between the cut ends of said turn.

6. Apparatus for cutting into lengths reinforced tubing consisting of a resilient shell having a metal helix embedded therein, said apparatus comprising a pair of support members axially aligned and slidable with respect to each other, a cutting jaw mounted on each of said support members and having portions for piercing said resilient shell and cutting a turn of said helix, said support members being adapted to hold apart the cut ends of said turn, a saw blade carried by a support arrangement movable into and out of operative relation with the tubing to be cut and positioned so that it cuts said shell between the cut ends of said turn, said tubing being positioned on said pair of support members, said support arrangement being pivotally mounted on a support shaft remote from said pair of support members.

7. Apparatus for cutting into lengths reinforced tubing consisting of a resilient shell having a metal helix embedded therein, said apparatus comprising a pair of support members axially aligned and slidable with respect to each other, a cutting jaw mounted on each of said support members and having portions for piercing said resilient shell and cutting a turn of said helix, said support members being adapted to hold apart the cut ends of said turn of said helix, means positioned adjacent to said support members for holding a length of tubing securely in engagement with said cutting jaws, and a saw blade movable into and out of operative relation with the tubing to be cut and positioned so that it cuts said tubing between the cut ends of said turn of said helix.

8. Apparatus for cutting into lengths reinforced tubing consisting of a resilient shell having a metal helix embedded therein, said apparatus comprising a support table, a pair of support plates axially aligned and slidable with respect to each other and mounted on said support table, a cutting jaw mounted on each of said support plates and having portions for piercing said resilient shell and cutting a turn of said helix, said support plates being adapted to hold apart the cut ends of said turn, a support member pivotally secured to said table and movable into and out of operative relation with said cutting jaws, tube-holding means secured to said support member and adapted to press a piece of tubing into intimate engagement with said cutting jaws which pierce said shell with one jaw on each side of a turn of said helix, and a saw blade carried by said support member and positioned to cut said shell between the cut ends of said turn of said helix.

References Cited in the file of this patent

UNITED STATES PATENTS

| | | |
|---|---|---|
| 1,915,988 | Frank | June 27, 1933 |
| 2,209,209 | Ruby | July 23, 1940 |
| 2,243,614 | Vogel | May 27, 1941 |
| 2,324,380 | Frei | July 13, 1943 |
| 2,588,016 | Korolyshun et al. | Mar. 4, 1952 |